(12) United States Patent
Christen et al.

(10) Patent No.: US 9,878,702 B2
(45) Date of Patent: Jan. 30, 2018

(54) METHOD FOR OPERATING A MOTOR VEHICLE AND THE MOTOR VEHICLE

(75) Inventors: Urs Christen, Aachen (DE); Engbert Spijker, Nuth (NL); Thomas Rambow, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1111 days.

(21) Appl. No.: 13/599,939

(22) Filed: Aug. 30, 2012

(65) Prior Publication Data
US 2013/0054072 A1    Feb. 28, 2013

(30) Foreign Application Priority Data

Aug. 30, 2011   (DE) .................. 10 2011 081 817

(51) Int. Cl.
| | |
|---|---|
| *B60W 20/13* | (2016.01) |
| *B60W 20/40* | (2016.01) |
| *H02J 7/14* | (2006.01) |
| *H01M 10/48* | (2006.01) |
| *H01M 10/44* | (2006.01) |
| *H01M 10/46* | (2006.01) |

(52) U.S. Cl.
CPC ............ *B60W 20/13* (2016.01); *B60W 20/40* (2013.01); *H01M 10/48* (2013.01); *H02J 7/1446* (2013.01); *H01M 10/44* (2013.01); *H01M 10/46* (2013.01); *H01M 2220/20* (2013.01); *Y02T 10/7016* (2013.01); *Y02T 10/92* (2013.01)

(58) Field of Classification Search
USPC ..................................... 701/22, 123
See application file for complete search history.

(56) References Cited

U.S. PATENT DOCUMENTS

| | | | | |
|---|---|---|---|---|
| 5,945,808 | A  * | 8/1999 | Kikuchi et al. ............... | 320/132 |
| 6,104,166 | A  * | 8/2000 | Kikuchi et al. ............... | 320/132 |
| 6,225,784 | B1 * | 5/2001 | Kinoshita et al. ............ | 320/132 |
| 7,360,615 | B2 * | 4/2008 | Salman et al. ................. | 701/48 |
| 7,564,213 | B2 * | 7/2009 | Bockelmann et al. ....... | 320/104 |
| 2005/0255965 | A1 * | 11/2005 | Tao et al. ....................... | 701/22 |
| 2005/0274553 | A1 * | 12/2005 | Salman et al. ................. | 701/48 |
| 2009/0118877 | A1 * | 5/2009 | Center et al. .................. | 701/22 |
| 2010/0030416 | A1 * | 2/2010 | Jinno .............................. | 701/22 |
| 2010/0063659 | A1 * | 3/2010 | Ogiso ............................ | 701/22 |

FOREIGN PATENT DOCUMENTS

| | | |
|---|---|---|
| DE | 4124496 A1 | 1/1993 |
| DE | 102006001201 B4 | 7/2007 |
| DE | 102007050346 A1 | 4/2009 |
| DE | 102008034461 A1 | 1/2010 |
| DE | 102011079469.7 | 1/2013 |

* cited by examiner

*Primary Examiner* — Dale W Hilgendorf
(74) *Attorney, Agent, or Firm* — Carlson, Gaskey & Olds

(57) ABSTRACT

In a method for operating a motor vehicle driven by an internal combustion engine and having a rechargeable battery and a generator for charging the battery, a charging acceptance of the battery is determined and a first charging mode, in which the generator is driven by the internal combustion engine in order to charge the battery, or a second charging mode, in which the generator is driven by a propulsionless travel movement of the motor vehicle, in order to charge the battery, is selected as a function of the charging acceptance.

9 Claims, 3 Drawing Sheets

METHOD FOR OPERATING A MOTOR VEHICLE AND THE MOTOR VEHICLE

CROSS-REFERENCE TO RELATED APPLICATIONS

This application is a continuation and claims the benefit of German Patent Application No. DE 102011081817.0 titled "Method for Operating a Motor Vehicle and the Motor Vehicle" filed Aug. 30, 2011, which is hereby incorporated by reference in its entirety.

TECHNICAL FIELD

The present disclosure relates to a method for operating a motor vehicle driven by an internal combustion engine having a rechargeable battery and a generator for charging the battery.

BACKGROUND

In motor vehicles, batteries are used for supplying electrical energy. The batteries supply energy to start an internal combustion engine of the motor vehicle. Batteries also provide loads which have to be operated when the internal combustion engine is in a stationary state and additional electrical energy for loads when the internal combustion engine is operated. The batteries are charged by a generator driven by the internal combustion engine.

In order to save fuel, it is known to charge the batteries by controlling the generator during vehicle braking to recapture the kinetic energy implemented during braking. Various methods have been developed for this which are intended to increase use of the battery and recovery of energy. In particular, battery monitoring systems (BMS) have been developed which determine the current state of charge (SOC), i.e. the proportion of the currently maximum storable charge which is actually stored at a particular time and the current charging capacity (or state of health, SOH), i.e. the proportion of a setpoint capacity of the battery that can be used at a particular time, so as to use this capacity to control the charging of the battery.

In many cases, the integral of current over time is used to determine the current state of charge SOC. The available charging capacity SOH drops in the course of a battery life. Methods for determining the state of charge SOC and the charging capacity SOH within the scope of a battery monitoring system are known, for example, from German Patent Application Nos. DE 10 2006 001 201 B4 titled "Procedure for controlling a battery charge procedure," DE 10 2007 050 346 A1 titled "Capacity-related state variable validation method for electrical energy storage i.e. battery, of motor vehicle, involves concluding plausibility of capacity-related state variable of storage depending on evaluation parameter," and DE 10 2008 034 461 A1 titled "Procedure and device for the determination of the operating condition of an automotive battery."

German Patent No. DE 41 24 496 A1 titled "Brake Assembly for Motor Vehicles with Electric Drive," which is not of the generic type, discloses that a brake system, provided for motor vehicles with an electric drive, is embodied in the form of a multi-circuit compound brake system which comprises friction brakes which act on the driven or on the non-driven wheels and an electro-regenerative brake system which is coupled directly or indirectly to the brake pedal and acts on the driven wheels.

It is desirable, however, to have a different method of managing battery recharging.

SUMMARY

One exemplary embodiment of the present invention relates to a method for operating a motor vehicle driven by an internal combustion engine and having a rechargeable battery and a generator for charging the battery, the method including: determining a charging acceptance of the battery; operating the generator in a first charging mode, in which the generator is driven by the internal combustion engine in order to charge the battery, or operating the generator in a second charging mode, in which the generator is driven by a propulsionless travel movement of the motor vehicle in order to charge the battery; and selecting the first or second charging mode as a function of the charging acceptance.

Another exemplary embodiment relates to a motor vehicle, having: an internal combustion engine which is arranged so as to drive the motor vehicle; a rechargeable battery; a generator for charging the battery; and a control device for actuating the generator to charge the battery. The control device is configured to determine a charging acceptance of the battery and to actuate the generator as a function of the charging acceptance.

Another exemplary embodiment relates to a method of controlling a vehicle generator for a rechargeable battery, including: determining a charge acceptance level; operating the generator in a first charging mode when the charge acceptance level is below a threshold; and operating the generator in a second charging mode when the charge acceptance level is above the threshold.

The present disclosure teaches a method for operating a motor vehicle driven by an internal combustion engine and having a rechargeable battery and a generator for charging the battery, wherein the battery is charged in a way which is optimized in terms of the fuel consumption. Furthermore, the object of the present invention is to specify a motor vehicle which is configured to carry out the method.

BRIEF DESCRIPTION OF THE DRAWINGS

The invention will be explained in more detail below by way of example with reference to the drawings, in which.

DETAILED DESCRIPTION

Figure 1:
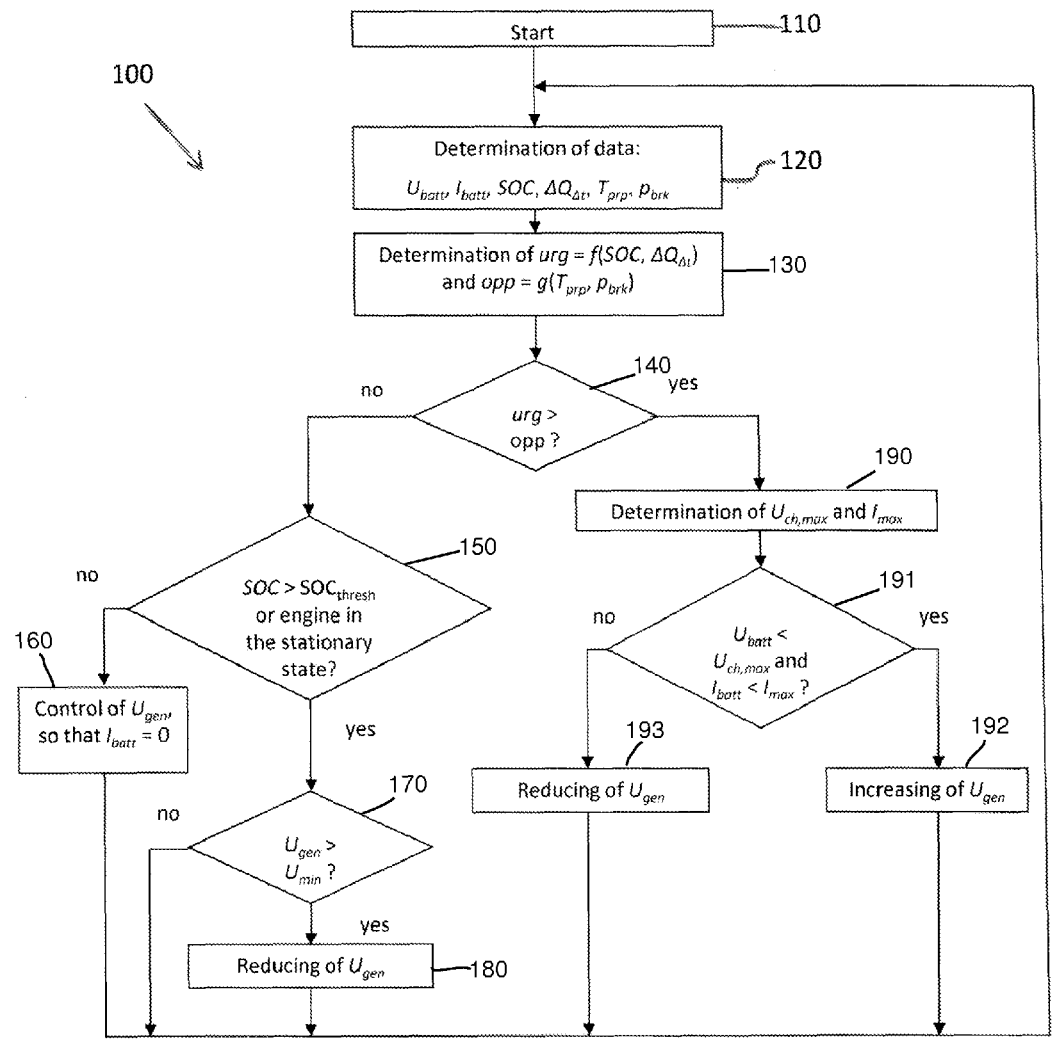
FIG. 1 shows a flowchart of an exemplary method of controlling a vehicle battery generator.

An exemplary motor vehicle, compatible with the present teachings includes a rechargeable battery and a generator. The generator is designed to charge the battery and can supply power to other vehicle components. The generator is driven by an internal combustion engine (or ICE) and for this purpose can be connected, if appropriate via a clutch, to the internal combustion engine. The generator can also be driven by means of vehicle travel movement or propulsion. The generator can be driven by travel movement of the motor vehicle in this way, in particular, by virtue of the fact that the internal combustion engine is coupled to a drive axle of the motor vehicle and the generator is coupled to the internal combustion engine. If the internal combustion engine does not generate any propulsion torque and the motor vehicle carries out propulsionless movement, the generator is driven by the travel movement. In particular, an output voltage of the generator that can be controlled in such a way that the battery is charged. The generator can also be embodied as a starter generator.

The battery can be, in particular, a lead accumulator battery. Such a battery is also referred to as a lead acid accumulator battery and can be filled (flooded), for example, with acid in an unbound form into which the lead electrodes dip, or can contain acid which is bound by a nonwoven made of glass fibers (absorptive glass mat, AGM). In principle, the invention is, however, also suitable for other types of rechargeable batteries.

According to the invention it has been realized that for consumption-optimal control of the charging of the battery of a motor vehicle driven by an internal combustion engine using a generator of the motor vehicle, knowledge of the charge acceptance is necessary. Charge acceptance (or "charging acceptance") is understood to be a maximum instantaneous charging current $I_{CA,inst}$ which can be taken up by the battery at a given time, or the maximum average charging current $I_{CA,avg}$; which can be taken up by the battery on average over a given time interval $\Delta t$. The maximum charge $\Delta Q_{\Delta t}$ that can be taken up by the battery in time interval, $\Delta t$, can also be used as a measure of charge acceptance. The time interval $\Delta t$ preferably has a length of an order of magnitude of the duration of driving processes which are relevant for charging the battery, for example, braking processes or propulsionless coasting of the motor vehicle. $\Delta t$ can, for example, be 10 s. The term "charging acceptance" can be used in the sense of the maximum charge, $\Delta Q_{\Delta t}$, that can be taken up by the battery in time interval, $\Delta t$. However, generally the statement of a maximum average charging current $I_{CA,avg}$ or a maximum instantaneous charge $I_{CA,inst}$ are equivalent.

Charge acceptance depends, in particular in the case of the lead accumulator batteries, on a multiplicity of parameters which are associated, for example, with previous charging phases and discharging phases and as a rule cannot be determined solely from the state of charge, SOC, and/or the charging capacity, SOH. A method for determining the charging acceptance is disclosed in German Patent Application No. DE 10 2011 079 469.7, entitled "Procedure for controlling a battery charge procedure," which is incorporated by reference into the present application.

A charge acceptance, $\Delta Q_{\Delta t}$, of the battery is determined. A first charging mode, in which the generator is driven by the internal combustion engine in order to charge the battery, or a second charging mode, in which the generator is driven solely or predominantly by a propulsionless travel movement of the motor vehicle, in order to charge the battery, is selected as a function of the charging acceptance determined. In the first charging mode, the generator can be actuated so that continuous charging of the battery takes place. In the second charging mode, continuous charging of the battery cannot take place but instead charging occurs only or at least predominantly in propulsionless phases, i.e. during propulsionless coasting or during braking of the motor vehicle. In the second charging mode, the battery is therefore not charged in specific driving situations. In one embodiment, in the second charging mode the generator is not actuated to charge the battery as long as the internal combustion engine generates a propulsion torque or the accelerator pedal of the motor vehicle is activated, the system waits to perform charging until a propulsionless driving situation arises.

Since the first or second charging mode is selected as a function of a charging acceptance of the battery, it is possible to ensure that the battery is charged in such a way that the available electrical power or charge can actually be taken up by the battery and that charging takes place with the aid of the internal combustion engine only when it is necessary on the basis of the determined charging acceptance of the battery. Additional consumption of fuel as a result of charging the battery can therefore be avoided in many cases and the charging can largely or solely be carried out by recovering kinetic or potential energy from movement of the motor vehicle. As a result, consumption-optimization operation of the motor vehicle is possible. This applies, in particular, to micro-hybrid vehicles, i.e. to motor vehicles with stop/start functionality.

In one embodiment, in the case of the first value of the charging acceptance the first charging mode is selected and in the case of a second value of the charging acceptance, higher than the first, the second charging mode is selected. In particular, a first threshold value of the charging acceptance can be predefined. The first charging mode is selected if the determined charging acceptance is below the first threshold value, and the second charging mode is selected if the determined charging acceptance is above the first threshold value. As a result, when the charging acceptance is low, the battery is charged by the internal combustion engine. In one embodiment, the battery is charged continuously and when the charging acceptance is relatively high the battery is charged when there is propulsionless travel movement, i.e. by recovering kinetic or potential energy of the motor vehicle. Since, in particular, a braking processes lasts only over relatively brief time periods, charging the battery by recovering kinetic energy during braking is effective when a high level of charging acceptance is available. If, on the other hand, the battery only has a low charging acceptance, for example, due to aging, it is necessary to charge by driving the generator using the internal combustion engine. As a result, charging of the battery which is further optimized in terms of the fuel consumption can be achieved.

In particular, it is advantageously possible to provide that a second threshold value for the charging acceptance can be predefined. If the determined charging acceptance is between the first and the second threshold values, the generator is actuated so as to charge the battery only at every propulsionless travel movement. If the determined charging acceptance is above the second threshold value, the generator is actuated so as to charge the battery only when a service brake of the motor vehicle is actuated. This ensures that in a central region of the charging acceptance, charging occurs not only during braking of the motor vehicle but also during propulsionless coasting. The battery is therefore charged whenever the motor vehicle carries out a travel movement without the internal combustion engine generating a propulsion torque, i.e. when the driver does not activate the accelerator pedal. In this context, although the speed of the motor vehicle or the distance which has been covered without propulsion is reduced by extracting movement energy, this is not undesired in every case and therefore does not lead to any additional consumption or only leads to a small amount of additional consumption. If, on the other hand, the charging acceptance has a high value, the battery is charged, and kinetic energy is therefore extracted, only during braking of the motor vehicle, i.e. when the driver wishes to reduce kinetic energy, with the result that in this case no additional consumption of fuel occurs. In this way, a particularly consumption-optimized method of operation of the motor vehicle can be achieved in terms of charging of the battery.

The charging acceptance $\Delta Q_{At}$ can be determined, in particular, continuously or at brief time intervals which can correspond, for example, to the duration of typical braking processes, for example at intervals of approximately 10 s. The charging acceptance therefore preferably constitutes the respective charging acceptance of the battery at a particular time. As a result, a consumption-optimized method of operation of the motor vehicle can be achieved at any time.

A state of charge SOC of the battery is determined and is taken into account in the selection of the charging mode. In particular in the case of a low state of charge or a low charging acceptance of the battery the first charging mode can be selected. In the case of a medium state of charge and a medium charging acceptance the second charging mode is selected. The battery is charged during propulsionless travel, i.e. both during coasting and during braking. In the other cases, in particular in the case of a high state of charge and a high charging acceptance, the generator is actuated so as to charge the battery only when the service brake is activated. In this context, one or more threshold values can also be predefined for the state of charge. The state of charge of the battery is preferably also determined continuously or at brief intervals. Jointly taking into account the state of charge and the charging acceptance of the battery permits the control of the charging of the battery to be optimized further in terms of consumption.

Furthermore, it is preferred that the battery is discharged when the state of charge of the battery exceeds a predefinable threshold value. As a result it is possible to ensure that the battery always has an optimum state of charge.

According to a further preferred embodiment of the method, a charging urgency measure urg is determined as a function of the state of charge SOC and the charging acceptance $\Delta Q_{At}$ of the battery, and a charging opportunity measure opp is determined as a function of a propulsion torque $T_{prp}$ of the internal combustion engine and a brake pressure $p_{brk}$ in a brake system or a brake line of the motor vehicle. In particular, the charging urgency measure urg is a predetermined function of the state of charge SOC and of the charging acceptance $\Delta Q_{At}$, urg=$f$(SOC, $\mu Q_{At}$). The charging opportunity measure opp is a predetermined function of the propulsion torque $T_{prp}$ and of the brake pressure $p_{brk}$, opp=g($T_{prp}$, $p_{brk}$).

Figure 2:
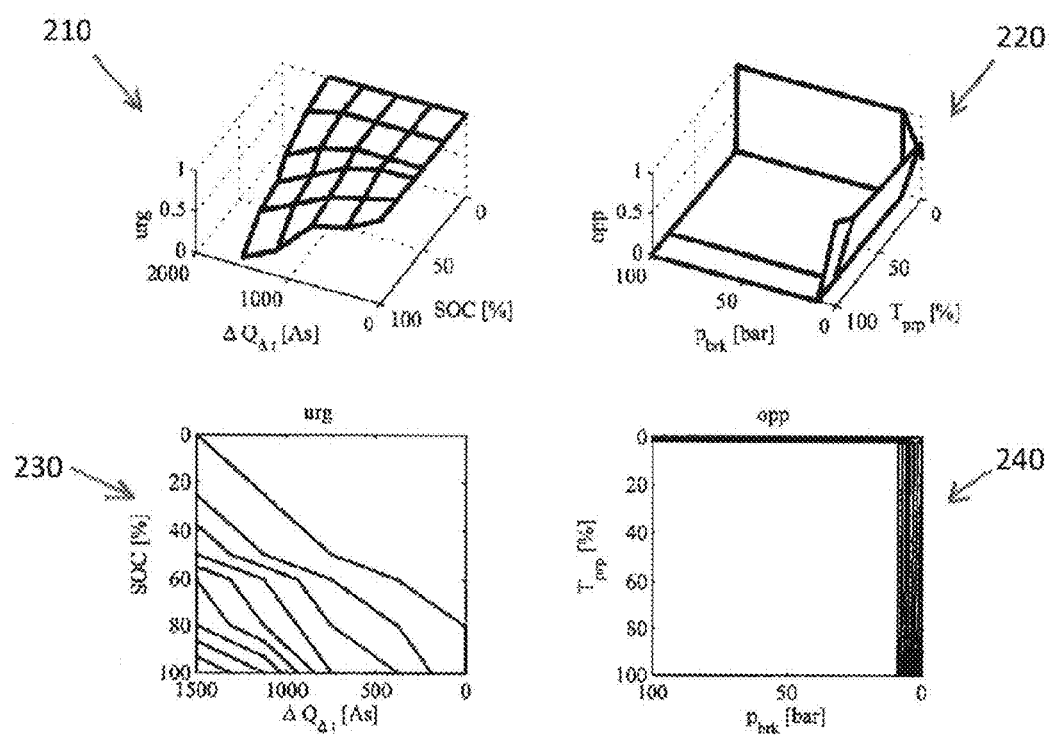
FIG. 2 shows exemplary look-up tables and graphs for determining a charging urgency measure and a charging opportunity measure according to the method of FIG. 1.

The functions $f$(SOC, $\Delta Q_{At}$) and g($T_{prp}$, $p_{brk}$) are implemented, for example, as characteristic diagrams or as look-up tables 210, 220, 230 and 240, as shown in FIG. 2. The generator is then actuated in order to charge the battery and a recharging process is initiated if the charging urgency measure urg is higher than the charging opportunity measure opp. Nevertheless, the motor vehicle is operated in the normal operating mode, i.e. the generator is not actuated so as to charge the battery. The input variables of the specified functions are preferably determined, evaluated continuously or at brief intervals. This permits the consumption-optimized control of the charging processes to be improved further.

The generator is actuated in such a way that the rate of change over time in the output voltage of the generator does not exceed a maximum value. As a result, the driver of the vehicle is not distracted by fluctuations in brightness of headlights, of other lamps or by fluctuations in the speed of electrically operated motors.

Figure 3:
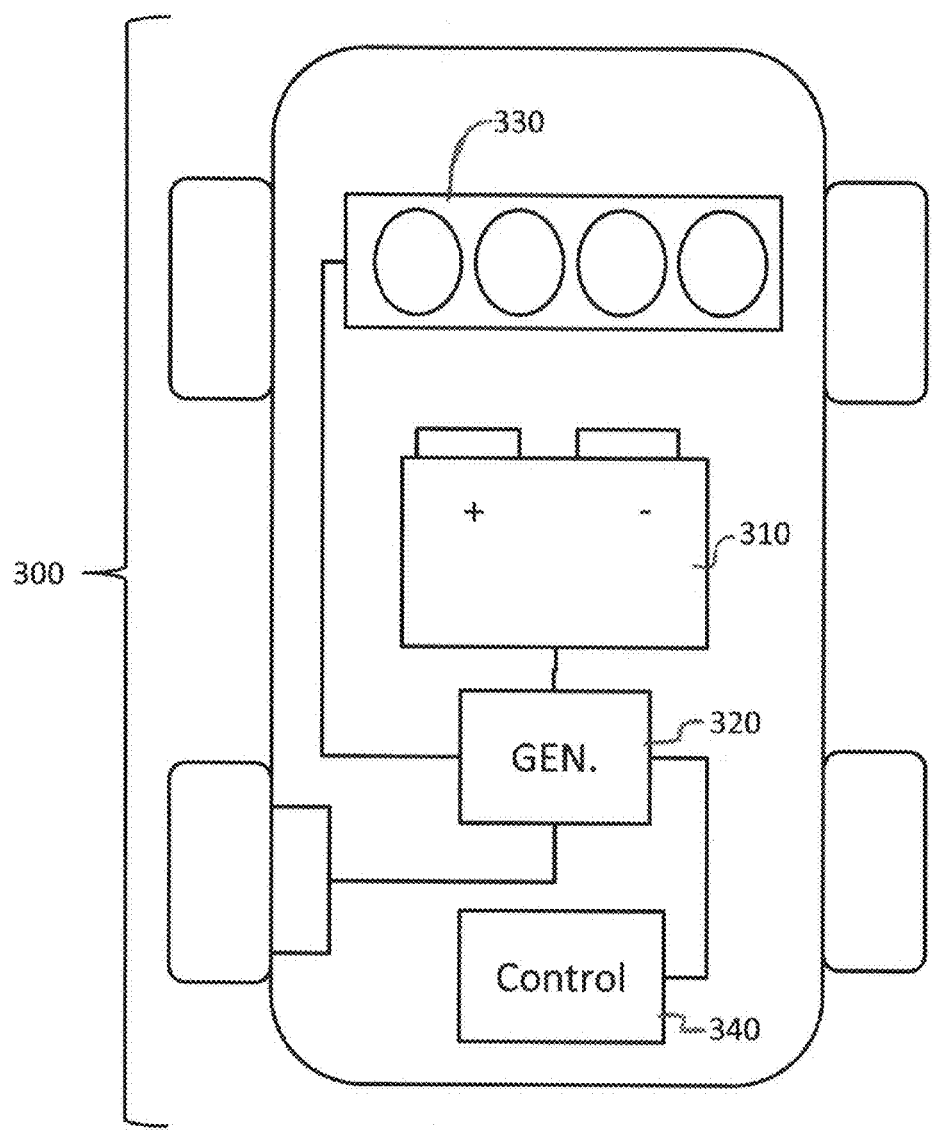
FIG. 3 shows a schematic depiction of a vehicle having a control device for a generator according to an exemplary embodiment of the present disclosure.

A motor vehicle 300, as shown in FIG. 3, includes an internal combustion engine 330 which is arranged so as to drive the motor vehicle; a rechargeable battery 310 and a generator 320 for charging the battery. The vehicle also includes a control device 340 for actuating the generator in order to charge the battery. The control device is designed to determine a charging acceptance of the battery and to actuate the generator so as to charge the battery as a function of the charging acceptance. The control device can comprise, for this purpose, a processor means for determining the charging acceptance and for selecting a charging mode as well as storage means for storing the characteristic diagrams and/or look-up tables for determining the charging urgency measure and the charging opportunity measure. In particular, the control device and the motor vehicle are configured overall in such a way that the motor vehicle can be operated according to the method described above.

An exemplary method illustrated schematically in FIG. 1 as a flow chart 100. The method can be executed by the control device 340. The method starts at 110. At step 120, data is first determined and made available, in particular the battery voltage, $U_{batt}$, the battery current, $I_{batt}$, the state of charge and the charging acceptance of the battery as well as the propulsion torque, $T_{prp}$, generated by the internal combustion engine and the brake pressure, $p_{brk}$. These values are determined, in particular, continuously and/or in time intervals which are compared to the charging processes, and therefore represent the respective operational variables at a particular time. The battery voltage, the battery current and the brake pressure can be determined directly and/or by sensors here. The propulsion torque of the internal combustion engine can be determined, for example, from the current position of the accelerator pedal, if appropriate with the aid of a computational model of the internal combustion engine or of a characteristic diagram including further variables such as, for example, the instantaneous rotational speed of the internal combustion engine. For example, a battery monitoring system can be used to determine the current state of charge SOC of the battery.

The charging acceptance at a particular time can be obtained, for example, from a model of the battery in which the battery is divided computationally into a predetermined number of compartments, i, which do not have to correspond to the physical cells or plates of the battery. The input variables of the model are the battery current, the measured voltage of the battery, the charging voltage, the state of charge of the battery which is obtained, for example, from a battery monitoring system, the charging capacity of the battery and the temperature of the battery. The following is obtained for the charging acceptance in a summarized vectorial notation:

$$\tilde{C}_i = C_i \cdot SOH$$

$$R_i = R_i(\vartheta)$$

$$\begin{bmatrix} \dot{U}_1 \\ \dot{U}_2 \\ \vdots \\ \dot{U}_i \\ \vdots \\ \dot{U}_n \end{bmatrix} =$$

-continued $$\begin{bmatrix} \frac{-1}{\tilde{C}_1 R_2} & \frac{1}{\tilde{C}_1 R_2} & 0 & 0 & \ldots & 0 \\ \frac{1}{\tilde{C}_2 R_2} & \frac{-1}{\tilde{C}_2}\left(\frac{1}{R_2}+\frac{1}{R_3}\right) & \frac{1}{\tilde{C}_2 R_3} & 0 & \ldots & 0 \\ 0 & & \ldots & & & 0 \\ 0 & \ldots & \frac{1}{\tilde{C}_i R_i} & \frac{-1}{\tilde{C}_i}\left(\frac{1}{R_i}+\frac{1}{R_{i+1}}\right) & \frac{1}{\tilde{C}_i R_{i+1}} & \ldots & 0 \\ 0 & & & \ldots & & 0 \\ 0 & & & \ldots & 0 & \frac{1}{\tilde{C}_n R_n} & \frac{-1}{\tilde{C}_n R_n} \end{bmatrix}$$

$$\begin{bmatrix} U_1 \\ U_2 \\ \vdots \\ U_i \\ \vdots \\ U_n \end{bmatrix} + \begin{bmatrix} \frac{1}{\tilde{C}_1} \\ 0 \\ \vdots \\ 0 \\ \vdots \\ 0 \end{bmatrix} I_{batt} + H_{SOC}(SOC_{BMS} - SOC) +$$

$$H_U(U_{batt,meas} - U_{batt})$$

$$U_{batt} = U_1 + R_1 I_{batt}$$

$$SOC = \frac{1}{C_{batt} \cdot SOH(U_{max} - U_{min})} \sum_{i=1}^{n} \tilde{C}_i (U_i - U_{min})$$

$$I_{CA,inst} = \frac{U_{ch} - U_1}{R_1}$$

$$I_{CA,avg} = C_{avg} U + (C_{avg} B + D_{avg}) U_{ch}$$

$R_i$ and $C_i$ are respectively the resistances and capacitances of the compartments i of the battery. In particular, the resistance values $R_i$ are temperature-dependent. B, $C_{avg}$ and $D_{avg}$ are state matrices which depend on $\tilde{C}_i$, $R_i$ and $\Delta t$. $U_{min}$ is the battery voltage in an open circuit when the battery is completely discharged. $U_{max}$ is the corresponding voltage when the battery is completely charged. $H_{SOC}$ and $H_U$ are feedback factors for correcting SOC and $U_{batt}$.

According to the maximum charging current which can be taken up, the instantaneous charging acceptance $I_{CA,inst}$ and the average charging acceptance $I_{CA,avg}$ are obtained as a result, and the charging acceptance can be calculated from the maximum charge which can be taken up in the time interval $\Delta t$ according to $\Delta Q_{\Delta t} = I_{CA,avg} \Delta t$. A charging urgency measure, urg=f(SOC, $\Delta Q_{\Delta t}$), and a charging opportunity measure—opp=g($T_{prp}$, $p_{brk}$)—are then determined at step 130 from the input variables determined in the previous step.

These measures can be, for example, dimensionless variables with values in the range between 0 and 1, which indicate, on the one hand, the urgency of the charging of the battery and, on the other hand, the possibility or opportunity of charging the battery. The respective functions can be stored, for example, as predetermined characteristic diagrams or look-up tables in a control device. Examples of such functions are shown in FIG. 2 in three-dimensional representation (at the top) or in a vertical line representation (at the bottom; here, vertical lines are respectively represented in intervals of 0.1). In the two left-hand illustrations, a value of the charging urgency measure urg between 0 and 1 can be read for each value of $\Delta Q_{\Delta t}$ and SOC. A value of the charging opportunity measure between 0 and 1 can also be read in the right-hand illustrations for each value of the brake pressure and the propulsion torque.

The values of the charging urgency measure and of the charging opportunity measure is determined in this way and compared with one another in the next step 140. If the charging urgency measure is not larger than the charging opportunity measure, the motor vehicle is operated in the normal operating mode. In the normal operating mode, it is first detected whether the state of charge SOC of the battery exceeds a threshold value $SOC_{thresh}$ and whether the internal combustion engine is in the stationary state at step 150.

If none of the two conditions is met, the output voltage $U_{gen}$ of the generator is regulated in such a way that the battery current $I_{batt}$ is equal to 0 at step 160. This means that the electrical energy which is required by the electrical loads of the motor vehicle is supplied solely by the generator and the battery is neither charged nor discharged.

If, on the other hand, one of the two conditions is met, the battery is discharged.

If the generator voltage is above a minimum voltage $U_{min}$, at step 170, at which the battery is discharged, the generator voltage $U_{gen}$ is reduced at step 180. This is done, in particular, with the maximum rate of change at which a driver of the motor vehicle still notices no change in the brightness of lamps or the speed of electric motors.

If, on the other hand, the current value of the charging urgency measure is higher than that of the charging opportunity measure, the battery is charged. For this purpose, the maximum voltage with which the battery can currently be charged is firstly determined, as is the maximum current, which can be used to charge the battery, at step 190. The difference between the maximum current which the generator can supply and the total current requirement of the electrical loads of the motor vehicle can then be determined.

In the next step 191 it is detected whether the battery voltage and the battery current are below the specified limits. If this is the case, the output voltage of the generator is raised at step 192, in particular with the maximum permissible speed, such that this cannot be perceived by the driver through the behavior of the electrical loads. If this is not the case, the output voltage of the generator is lowered at step 193, and the generator voltage fluctuates in a narrow range around the specified limiting values.

A generator in a passenger car is usually able to supply approximately 2.0-2.5 kW electrical power. If this power were to be generated by the internal combustion engine of the vehicle, this would lead to additional consumption of fuel. According to the invention, the corresponding power is drawn from the kinetic or potential energy of the vehicle, in particular when, owing to the driving situation, the kinetic energy is being reduced in any case by braking. If neither the brake pedal nor the accelerator pedal is activated, the engine should not be loaded by driving the generator to charge the battery. However, this is possible only if the charging acceptance of the battery is sufficiently large. Within a typical time period $\Delta t=10$ s the generator can supply more than 1000 amps. The charging acceptance $\Delta Q_{10s}$ should therefore be of this order of magnitude in order to permit the battery to be charged by recovering the kinetic energy of the vehicle. The lower the charging acceptance, the greater the need to use the internal combustion engine to drive the generator to charge the battery, i.e. also to consume fuel for this purpose. In an intermediate range it may be necessary also to charge the battery in driving situations in which the vehicle coasts in a propulsionless fashion, i.e. without the driver activating the brake pedal or the brakes. If the charging acceptance of the battery assumes a very low value, continuous charging of the battery is necessary. This results in increased fuel consumption of the internal combustion engine.

The described method can also be used when the generator is not being driven by means of the engine but rather directly by means of travel movement, for example, the generator is installed on the transmission. In this case too, the kinetic energy of the vehicle is to be reduced only when the service brake is activated, insofar as the charging acceptance permits.

The invention claimed is:

1. A method of controlling a vehicle generator for a rechargeable battery, comprising:
   determining a charge acceptance level;
   operating the generator in a first charging mode when the charge acceptance level is below a threshold;
   operating the generator in a second charging mode when the charge acceptance level is above the threshold; and
   restricting the generator to only operate when a charging urgency measure is higher than a charging opportunity measure.

2. The method of claim 1, wherein in the first charging mode the generator is configured to be driven by an internal combustion engine.

3. The method of claim 2, wherein in the second charging mode the generator is configured to be driven by propulsionless travel.

4. The method of claim 3, wherein in the second charging mode the generator is configured to be driven by actuation of the service brakes of a vehicle.

5. The method of claim 1, further comprising:
   determining a state of charge for the battery; and
   discharging the battery when the state of charge exceeds a threshold value.

6. A control device for a hybrid vehicle generator, the control device is configured to determine a charging acceptance of a vehicle battery and actuate the generator as a function of the charging acceptance, wherein the control device is configured to actuate the generator only when a charging urgency measure is higher than a charging opportunity measure.

7. The control device of claim 6, wherein the control device is further configured to operate the generator in a first charging mode when the charge acceptance level is below a threshold and operate the generator in a second charging mode when the charge acceptance level is above the threshold.

8. The control device of claim 7, wherein in the first charging mode the control device is configured to allow the generator to be driven by an internal combustion engine.

9. The control device of claim 7, wherein in the second charging mode the control device is configured to allow the generator to be driven by propulsionless travel.

* * * * *

UNITED STATES PATENT AND TRADEMARK OFFICE
CERTIFICATE OF CORRECTION

PATENT NO. : 9,878,702 B2
APPLICATION NO. : 13/599939
DATED : January 30, 2018
INVENTOR(S) : Urs Christen, Engbert Spijker and Thomas Rambow Page 1 of 1

It is certified that error appears in the above-identified patent and that said Letters Patent is hereby corrected as shown below:

In the Claims

In Claim 4, Column 10, Line 3; before "of a vehicle" replace "the service brakes" with --a service brake--

In Claim 7, Column 10, Line 17; after "charging mode when" replace "the charge acceptance level" with --the charging acceptance--

Signed and Sealed this
Twenty-fifth Day of September, 2018

Andrei Iancu
*Director of the United States Patent and Trademark Office*